Figure 1:
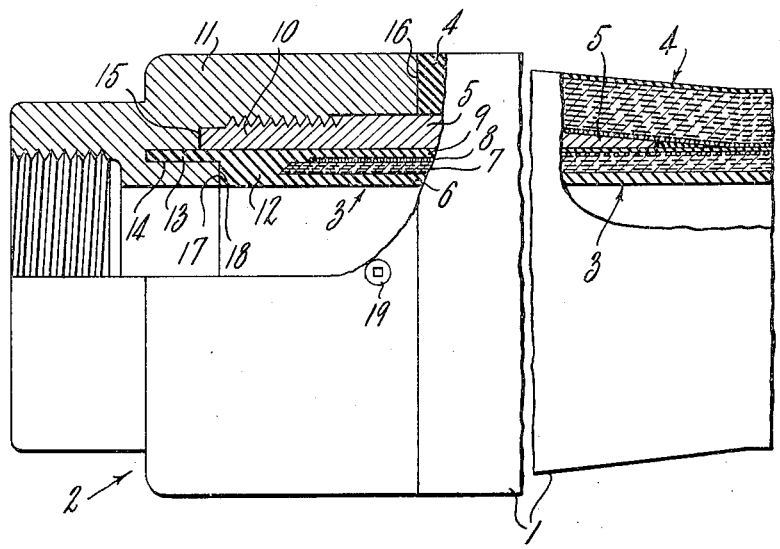

Oct. 20, 1942.　　　J. A. MULLER　　　2,299,171
ROTARY HOSE COUPLING
Filed Jan. 18, 1941

INVENTOR.
JOHN A. MULLER
BY Lester J. Budlong
ATTORNEY

Patented Oct. 20, 1942

2,299,171

UNITED STATES PATENT OFFICE 2,299,171

ROTARY HOSE COUPLING

John A. Muller, Paterson, N. J., assignor to United States Rubber Company, New York, N. Y., a corporation of New Jersey Application January 18, 1941, Serial No. 375,010

7 Claims. (Cl. 285—71)

This invention relates to improvements in high pressure hose and end coupling constructions and is a continuation-in-part of my co-pending application Serial No. 284,581 filed July 15, 1939, now Patent No. 2,234,350 of March 11, 1941.

Heretofore it has been difficult to produce high pressure hose and end coupling constructions for use in high pressure drilling operations, such as rotary drilling operations in oil fields, which were strong, durable and efficient and, at the same time, of economic construction and of compact arrangement without reducing the internal diameter at any point in the completed structure. Conventional hose and end coupling constructions which functioned satisfactorily for low pressure ranges of operation were found to be totally unsuited and inadequate for the extremely high pressures of the present day oil well drilling operations; for example, ranges as high as or higher than one thousand pounds per square inch. The demands for these greatly increased operating pressures and more-efficient well drilling apparatus have necessitated the production of improved hose and end coupling constructions.

The improved hose and end coupling constructions of this invention substantially eliminate the objectionable features of former constructions by producing strong, durable, efficient and economical structures which are exceedingly compact and which at the same time maintain uniform internal diameters or bores at all points throughout their entire lengths. I accomplish my invention by forming hose structures having laminations of rubber composition, wire and rubberized fabric and embedding within the laminations thereof elongated tubular portions of end coupling assemblies so as to be, upon subsequent vulcanization, firmly secured relative to each other and form structures of exceptional strength and durability.

The parts of my hose and end coupling assemblies are so constructed and arranged that the internal pressure tends to force the inner wall or carcass of the laminated hose into more intimate and more intense engagement with parts of its associated end coupling assembly, and the greater the pressure becomes within the hose the greater the sealing effect between the hose and coupling assembly becomes.

In order to insure a perfect seal between the end coupling assembly and the laminated hose structure throughout the entire range of operating pressures, I have found it desirable to employ a tubular section of soft, flexible and yieldable rubber composition at the end of the inner wall portion of the hose for forming a fluid-tight seal between the hose and the coupling assembly. In such structures, as the pressure builds up the flexible tubular section becomes operative to prevent seepage of fluid between portions of the coupling assembly and the hose by being pressed radially outward against the portions of the coupling assembly in proportion to the pressure within the hose.

Figure 2:
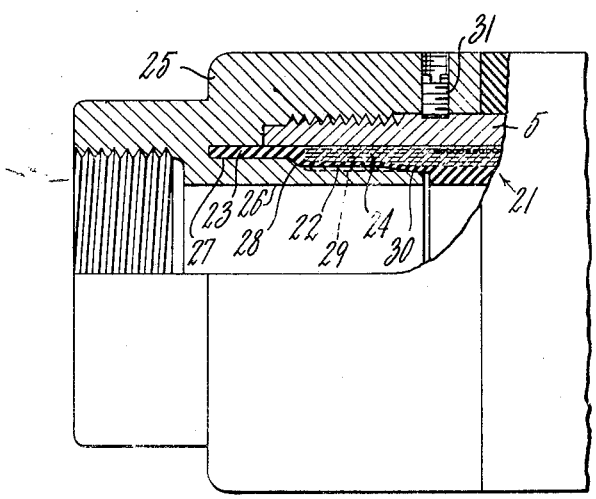

The invention will more readily be understood from the following descriptions of certain present preferred embodiments thereof taken in conjunction with the accompanying drawing, in which:

Fig. 1 is an elevational view, partly broken away and partly in section, showing a preferred embodiment of my laminated hose and end coupling construction; and Fig. 2 is an elevational view, partly broken away and partly in section, showing a modified form of my invention.

Referring to the drawing and in particular to Fig. 1, there is shown a high pressure flexible hose 1 and a metallic end coupling assembly 2 joined together to form a complete structure having substantially smooth continuous inner and outer surfaces. The hose 1 comprises inner and outer laminated tubular walls 3 and 4 which are separated near their free ends so as to receive and be positioned upon opposite sides of an elongated tubular nipple 5 forming a part of the end coupling assembly 2. The inner wall 3 of the hose comprises an inner surface layer 6 of rubber composition, which may be formed upon an elongated mandrel of proper size and shape. About the layer 6 are placed a plurality of layers or plies of fabric reinforcing 7 and metallic reinforcing 8 which are arranged to terminate inwardly of the free end of the wall 3 so as to be completely covered and sealed by a section of rubber composition to be hereinafter described. A second layer of rubber composition 9 is located upon the reinforcing 8 and forms a substantially smooth cylindrical surface for the nipple 5 which is of such size as to slide onto and fit closely about the outer surface of this layer. The outer wall 4 is then placed about the nipple 5 in such a manner as to leave a threaded end portion 10 of the nipple exposed for engagement with a coupling member 11.

The inner wall 3 of the hose 1 has its end portion formed as a tubular section 12 of soft, flexible and yieldable rubber composition. This tubular section is employed for forming a fluid-tight seal between the hose 1 and coupling assembly 2. The tubular section 12 comprises at its free end a thin walled tubular extension 13 also formed of soft, flexible and yieldable rubber composition, and this extension is arranged to extend into a relatively deep circumferential recess 14 accurately machined or formed in the coupling member 11 between the main body of the coupling member and an internal wall having an end 17. While this extension 13 is of such wall thickness that it will slide easily into the recess 14, it is desirable that it extend to the bottom of the recess and substantially fill the recess and lie against the outer surface thereof.

The coupling member 11 is provided with an intermediate shoulder 15 for engaging the circumferential end portion of the nipple 5, forming a joint therewith which is sealed by the soft flexible extension 13. The coupling member 11 is also provided with an outer abutment 16 for engaging the end of the outer wall 4 of the hose and an inner abutment 17 on the inner wall which defines the recess 14 for engaging a step or shoulder 18 formed in the soft tubular section 12 of rubber composition, at a location further inward from the open end of the assembly than the joint between the end of the nipple 5 and the shoulder 15 so that the soft rubber composition adjacent this joint will be completely enclosed in the recess 14 by the relatively thick portion 12 of the inner wall of the hose and will be subjected to fluid pressure before any fluid could seep between the coupling member and rubber composition and reach this joint. This internal pressure presses the soft rubber extension 13 radially outward into sealing contact with both the nipple 5 and the coupling member 11, thus effectively sealing the joint between these two members. Internal threads are provided upon the coupling member for engagement with the threaded portion of the nipple 5 and a set screw 19 may be employed to prevent rotation of the coupling member 11 relative to the nipple 5 when the structure has been assembled and is ready for use.

When the hose 1 and coupling assembly 2 are placed in operation and subjected to internal fluid pressures, with the section 12 and the extension 13 of the soft, flexible and yieldable rubber composition at the free end of the inner wall 3 in engagement with wall portions of the recess 14 and the inner surface of the nipple 5, this structure produces a simple but secure seal between the hose and the coupling assembly. The rubber composition of the section 12 and extension 13 tend to yield readily when subjected to the slightest internal pressure. The extension 13 is held in initial contact with both the outer wall of the recess 14 and with the inside of the metal thimble 5 by the inner wall of the coupling member which terminates in the shoulder 17. The extension thus forms an effective seal for the joint 15 between the coupling member and the nipple, the force of the sealing contact being proportional to the pressure within the hose. This arrangement is such as to maintain a tight seal throughout the entire range of operating pressures to which the structure is subjected. As the tubular extension 13 is completely enclosed there is no possibility of it being disturbed, injured or worn away by abrasion during drilling operations.

Fig. 2 shows a somewhat similar form of construction of my hose and end coupling assembly but differs from that shown in Fig. 1 in that the inner tubular wall 21 in the latter construction is provided with an intermediate fabric reinforced portion 22 of somewhat reduced wall thickness to which a soft yieldable thin walled end extension 23 of rubber composition is secured. This intermediate portion 22 is formed of rubber composition reinforced by layers of fabric 24 embedded therein; the metallic reinforcing employed in the body of the hose being terminated short of this portion 22. A coupling member 25 threaded onto the end of the nipple 5 is provided with an internal integral tubular collar 26 which is arranged to fit within the end of the nipple 5 and form with the nipple and other portions of the coupling member 11 and nipple 5 a relatively deep recess 27 for housing the extension 23 and intermediate portion 22 of the inner wall 21. A bevelled surface 28 is provided upon the collar 26 and serves to direct the thin walled yieldable extension 23 into the recess 27 as the coupling member 25 is being screwed on to the nipple 5.

Since the intermediate portion 22 of the inner wall 21 has, as indicated by dotted lines at 29, an internal diameter slightly less than the diameter of that portion of the collar 26 which is normally positioned adjacent this intermediate section 22, a beveled surface 30 is provided and serves to guide the collar 26 into this restricted portion 22 of the hose as the coupling member 25 is threaded onto the nipple 5. The wedging action produced by these carefully proportioned parts of the assembly causes a very tight fit in this part of the assembly, forcing the intermediate section radially outward against the nipple 5 and subsequently, when the hose is placed in operation and subjected to internal pressure this intermediate reinforced portion of the inner wall 21 forms a seal between the nipple 5 and extension or collar 26. However, should any leakage occur between the collar 26 and the wall of the hose, the pressure will urge the soft rubber composition of the extension 23 outward into sealing contact with both the nipple 5 and coupling 25 and create a more intimate engagement between the extension 23 and adjacent portions of the nipple 5 and the coupling member 25. The reinforcing of the section 22 serves to prevent any substantial movement of this section while the coupling member 25 is being screwed into place, and a set screw 31 serves to prevent subsequent rotation between the coupling member and the hose. As the reinforced intermediate section 22 and the flexible end section 23 of the inner tubular wall 21 are completely enclosed within the end coupling assembly, they are well protected from displacement, injury and abrasion at all times.

Thus from the foregoing description it will be seen that by my invention I have produced structures which are strong, efficient and durable. These structures are such that the greater the internal pressure becomes the greater the sealing effect becomes between the flexible end portion of the inner walls of the hose and the end coupling assemblies. In each construction it is apparent from the drawing that the internal diameter or bore throughout the entire length of the hose and coupling assembly is constant and accordingly will not restrict or impede the flow of fluids therethrough. And also, in each form of construction no objectionable projections are present upon the outer surface of the hose assembly to interfere with its handling and installation. It is not necessary in the use of my invention to adjust or maintain parts of the structures after they have been properly assembled. However, should the metallic coupling member, 11 or 25, become injured or worn, or should it be desired for any other reason to replace this member by another, this member can be easily removed and replaced by one skilled in the art without requiring the use of special tools or the like. The substantially straight cylindrical wall construction of the several parts of the hose and end coupling constructions of my invention produce structures which may be easily, quickly and economically machined, formed or built without difficulty or unnecessary expense.

Although the invention has been described in connection with the specific details of preferred embodiments thereof, it should be understood that such details are not intended to be limitative of the invention except insofar as is set forth in the accompanying claims.

Having thus described my invention, what I claim and desire to protect by Letters Patent is:

1. A hose and coupling construction comprising in combination a rigid tubular nipple, a hose having a tubular wall of rubber composition inside the nipple, and a coupling member secured to the nipple and forming a joint with the nipple disposed radially outside the wall, said wall having a portion of soft yieldable rubber composition projecting beyond the nipple to overlie the joint, said projecting portion being adapted to be pressed radially outward by pressure within the hose and to form a sealing contact with the coupling member under the influence of such pressure, and supporting means integral with the coupling member disposed inside the projecting portion of the wall of the hose for holding said portion initially in contact with the coupling member, said wall and supporting means being of substantially the same internal diameter to present a substantially smooth bore throughout the hose and coupling.

2. A hose and coupling construction comprising in combination a rigid tubular nipple, a hose having a tubular wall of rubber composition inside the nipple, a coupling member secured to the nipple and forming a joint with the nipple disposed radially outside the wall, said wall having a portion of soft yieldable rubber composition projecting beyond the nipple to overlie the joint, said projecting portion being adapted to be pressed radially outward by pressure within the hose and to form a sealing contact with both the nipple and the coupling member under the influence of such pressure, and supporting means integral with the coupling member disposed inside the projecting portion of the wall of the hose, said supporting means overlying said joint and holding said portion initially in contact both with the coupling and with the nipple, said wall and supporting means being of substantially the same internal diameter to present a substantially smooth bore throughout the hose and coupling.

3. A hose and coupling construction comprising in combination a rigid tubular nipple, a hose having a tubular wall of rubber composition inside the nipple, the wall having a portion of soft yieldable rubber composition projecting beyond the nipple, a coupling member secured to the nipple, said coupling member and nipple being adapted to be assembled by relative axial movement, and said coupling member having an axially extending annular recess open at one of its axial ends and adapted to receive the projecting portion of the tubular wall when the coupling and nipple are assembled.

4. A hose and coupling construction comprising in combination a rigid tubular nipple, a hose having a tubular wall of rubber composition inside the nipple, the wall having a portion of soft yieldable rubber composition projecting beyond the nipple, the wall also having a relatively stiff section adjacent the projecting portion, a coupling member secured to the nipple, a wall on said coupling member spaced from the body thereof to form with the coupling member and nipple a recess to receive the projecting portion of said tubular wall, said projecting portion being completely enclosed in said recess by said relatively stiff section of the wall.

5. A hose and coupling construction comprising in combination a rigid tubular nipple, a hose having a tubular wall of rubber composition inside the nipple, said wall having a relatively thin portion of soft yieldable rubber composition projecting beyond the nipple, said wall also having a relatively thicker portion adjacent the projecting portion, a coupling member secured to the nipple and having an annular recess to receive the projecting portion of the tubular wall, and means on the coupling member for forming a contact with the relatively thick portion of the wall to enclose the annular extension within said recess.

6. A hose and coupling construction comprising in combination a rigid tubular nipple, a hose having a tubular wall of rubber composition inside the nipple, said wall having a relatively thin portion of soft yieldable rubber composition extending beyond the nipple, the wall also having relatively thick section adjacent the projecting portion, a coupling member secured to the nipple and having an annular recess to receive the projecting portion of the tubular wall, and a tubular extension on said coupling member projecting axially beyond said recess and lying within and engaging the relatively thick section of the wall, the outer diameter of said tubular extension being greater than the normal inner diameter of said thick section of the wall to wedge the relatively thick section between the tubular extension and the nipple and to enclose the projecting portion in said recess by the wedged thick portion of the wall.

7. A hose and coupling construction comprising in combination a rigid tubular nipple, a hose having a tubular wall of rubber composition inside the nipple, said wall having a relatively thin portion of soft yieldable rubber composition projecting beyond the nipple, the wall also having an intermediate section relatively thicker than the projecting portion and relatively thinner than the remainder of the wall, a coupling member secured to the nipple and having an annular recess to receive the projecting portion of the tubular wall, and a tubular extension on said coupling member projecting axially beyond said recess and disposed within the intermediate section of the wall, the outer diameter of said tubular extension being greater than the normal inner diameter of said intermediate section of the wall to wedge said intermediate section between the tubular extension and the nipple to enclose the projecting portion within the recess by said wedge portion, the inner diameter of said tubular extension being substantially equal to the inner diameter of the main portion of the hose.

JOHN A. MULLER.